United States Patent
Barrall et al.

(10) Patent No.: US 9,486,833 B2
(45) Date of Patent: Nov. 8, 2016

(54) GASKET WITH HIGH TEMPERATURE COATING

(71) Applicant: Interface Solutions, Inc., Lancaster, PA (US)

(72) Inventors: Jeffery L. Barrall, Lititz, PA (US); Brian C. Lehr, Lancaster, PA (US)

(73) Assignee: Interface Performance Materials, Inc., Lancaster, PA (US)

( * ) Notice: Subject to any disclaimer, the term of this patent is extended or adjusted under 35 U.S.C. 154(b) by 58 days.

(21) Appl. No.: 14/175,286

(22) Filed: Feb. 7, 2014

(65) Prior Publication Data

US 2014/0217679 A1    Aug. 7, 2014

Related U.S. Application Data

(60) Provisional application No. 61/761,726, filed on Feb. 7, 2013.

(51) Int. Cl.
| | | |
|---|---|---|
| *B05C 3/02* | (2006.01) | |
| *C23C 24/08* | (2006.01) | |
| *F16J 15/08* | (2006.01) | |
| *B05D 3/02* | (2006.01) | |

(52) U.S. Cl.
CPC ........... *B05D 3/0254* (2013.01); *C23C 24/082* (2013.01); *F16J 15/0806* (2013.01); *F16J 15/0825* (2013.01); *F16J 15/0818* (2013.01); *F16J 2015/0856* (2013.01); *F16J 2015/0862* (2013.01)

(58) Field of Classification Search
CPC ............... F16J 15/0818; F16J 15/0825; F16J 2015/0856; F16J 2015/0862
See application file for complete search history.

(56) References Cited

U.S. PATENT DOCUMENTS

| 3,575,432 A | 4/1971 | Taylor |
|---|---|---|
| 3,797,836 A | 3/1974 | Halling |
| 4,589,666 A | 5/1986 | Halling |
| 6,237,921 B1 | 5/2001 | Liotta |
| 8,197,613 B2 | 6/2012 | Kerber |

(Continued)

FOREIGN PATENT DOCUMENTS

| DE | 20 2006 014 072 U1 | 12/2006 |
|---|---|---|
| DE | 20 2008 01025 U1 | 11/2008 |

(Continued)

OTHER PUBLICATIONS

International Search Report and Written Opinion in PCT/US2014/015377, Jun. 12, 2014.

(Continued)

*Primary Examiner* — Kristina Fulton
*Assistant Examiner* — Nicholas L Foster
(74) *Attorney, Agent, or Firm* — Womble Carlyle Sandridge & Rice LLP

(57) ABSTRACT

A method of making a gasket having a high temperature coating that includes obtaining a substrate formed from a metallic material and having the shape of a gasket, applying a nanoparticle suspension over the outer surfaces of the substrate, and heating the substrate to a first elevated temperature to form an undercoat layer of a self-protective oxide coating. The method also includes applying a liquid comprising boron nitride over the undercoat layer and drying the boron nitride liquid at a second elevated temperature to form an overcoat layer.

8 Claims, 11 Drawing Sheets

(56) References Cited

U.S. PATENT DOCUMENTS

| | | | |
|---|---|---|---|
| 2002/0171206 A1* | 11/2002 | Kozerski | F01N 13/16 277/592 |
| 2002/0190483 A1* | 12/2002 | Murakami | F16J 15/126 277/627 |
| 2004/0056431 A1 | 3/2004 | Shiokawa et al. | |
| 2005/0209386 A1* | 9/2005 | Atkinson | C04B 14/204 524/442 |
| 2007/0141370 A1* | 6/2007 | Kerber | B82Y 30/00 428/469 |
| 2007/0216109 A1* | 9/2007 | Friedow | F01N 13/1827 277/593 |
| 2009/0208775 A1 | 8/2009 | Payne | |
| 2010/0096811 A1 | 4/2010 | Datta | |
| 2010/0105264 A1* | 4/2010 | Pistner | F16J 15/0818 442/59 |
| 2012/0288700 A1* | 11/2012 | McMullin | B82Y 30/00 428/220 |
| 2014/0217679 A1 | 8/2014 | Barrall | |
| 2015/0137508 A1* | 5/2015 | Lehr | F01N 13/10 285/145.4 |

FOREIGN PATENT DOCUMENTS

| | | |
|---|---|---|
| WO | WO 2006/138394 A2 | 12/2006 |
| WO | WO 2010/009801 | 2/2010 |
| WO | WO 2013/109433 A1 | 7/2013 |

OTHER PUBLICATIONS

International Search Report and Written Opinion dated Feb. 25, 2015 from International Application No. PCT/US2014/065775.

\* cited by examiner

| Gasket | | As Received | After 16 hours at 800C | After 100 hours at 800C |
|---|---|---|---|---|
| REF: Plain 301SS w/o nanoparticle layer w/o boron nitride layer | Peak Sliding Avg | 0.22 0.17 0.20 | 0.49 0.45 0.47 | 0.52 0.58 0.55 |
| REF: Plain 301SS w/ nanoparticle layer w/o boron nitride layer | Peak Sliding Avg | 0.17 0.14 0.16 | 0.38 0.38 0.38 | 0.54 0.52 0.53 |
| Concept 1A w/o nanoparticle layer w/ boron nitride layer | Peak Sliding Avg | 0.16 0.14 0.15 | 0.19 0.19 0.19 | 0.23 0.21 0.22 |
| Concept 1A w/ nanoparticle layer w/ boron nitride layer | Peak Sliding Avg | 0.19 0.17 0.18 | 0.18 0.18 0.18 | 0.23 0.24 0.24 |
| Concept 1B w/ nanoparticle layer w/ intermediate heating w/ boron nitride layer | Peak Sliding Avg | 0.19 0.17 0.18 | 0.18 0.17 0.17 | 0.22 0.20 0.21 |

*FIG. 10*

GASKET WITH HIGH TEMPERATURE COATING

RELATED APPLICATIONS

This patent application claims the benefit of U.S. Provisional Patent Application No. 61/761,726, filed on Feb. 7, 2013, and entitled "Gasket With High Temperature Coating", which application is incorporated by reference in its entirety herein.

TECHNICAL FIELD

This application relates generally to gaskets for use in high temperature applications, and in some embodiments to gaskets for sealing around the exhaust ports and exhaust piping found in the engine blocks, turbochargers, and catalytic converters of internal combustion engines.

BACKGROUND

Internal combustion engines for heavy duty vehicular and non-vehicular applications, such as trucks, tractors, buses, well-drilling machines, boring machines, portable pumping units, emergency power generators, and the like, can generate significant amounts of heat and produce exhaust gases that are hotter than the exhaust gases produced by non-commercial cars and trucks. Accordingly, the exhaust piping joints for the exhaust manifolds, the turbocharger, the EGR system, and the catalytic converter of such engines can become exceedingly hot. Unfortunately, exhaust piping gaskets made from the more-common stainless steel alloys, which are generally suitable for the lower exhaust gas temperatures found in non-commercial cars and trucks, will often experience severe oxidation corrosion leading to the deterioration or flaking of their outer surfaces in the heavy duty, high temperature applications. As a result, specialized high temperature gaskets formed from expensive and exotic metal alloys, such as the class of austenitic nickel-chromium-based superalloys produced and sold under the Iconel™ brand of materials, may be required.

Consequently, a need exists for an effective treatment or coating that could be applied to lower cost gasket substrates made from the more-common stainless steels, and that would allow the gaskets to perform effectively and without substantial oxidation corrosion or deterioration or flaking of their outer surfaces in high temperature applications, such as the heavy duty applications described above. It is toward such a high temperature coating or treatment that the present disclosure is directed.

SUMMARY

Briefly described, one embodiment of the present disclosure comprises a method of making a gasket having a high temperature coating. The method includes obtaining a substrate formed from a metallic material and having the shape of the gasket, and applying a nanoparticle solution or suspension over the outer surfaces of the substrate. The nanoparticle suspension comprises a plurality of nanoparticles suspended in a carrier fluid, and in which the nanoparticles can have an average particle size of less than or about 50 nanometers. The method also includes heating the substrate to a first elevated temperature that is between about 80° C. and 600° C. to form an undercoat layer. The undercoat layer can be a self-protective oxide coating, and is configured to inhibit excess oxidation of the surface of the substrate when the gasket is exposed to temperatures greater than or about 600° C.

After cooling the substrate and undercoat layer, the method further includes applying a boron nitride coating over at least a portion of the undercoat layer and heating the substrate to a second elevated temperature that is between about 80° C. and 200° C., to dry the boron nitride coating into a overcoat layer on top of the undercoat layer. The overcoat layer is configured to provide lubricity to the undercoat layer and substrate when the gasket is exposed to temperatures greater than about 600° C.

Another embodiment of the disclosure comprises a gasket having a high temperature coating. The gasket includes a substrate formed from a metallic material and having a shape of a gasket, with the substrate having an upper surface, a lower surface, and an aperture formed therethrough. The gasket also includes an undercoat layer that covers substantially all of the surface area of one or both of the upper surface and the lower surface, with the undercoat layer comprising a self-protective oxide coating formed from a plurality of nanoparticles that have been applied to the surface and heated to a first elevated temperature that is between about 80° C. and 600° C., and is preferably between about 80° C. and 100° C., and for a predetermined period of time. The gasket further includes an overcoat layer on the undercoat layer to provide lubricity to the surface when the gasket is exposed to temperatures greater than about 600° C., with the overcoat layer generally comprising boron nitride.

Another embodiment of the disclosure comprises a method of making a gasket having a high temperature coating. The method includes obtaining a substrate formed from a metallic material and having a shape of a gasket, the substrate having an upper surface, a lower surface, and an aperture formed therethrough, and applying a nanoparticle suspension over substantially all of the surface area of one or both of the upper surface and the lower surface, with the nanoparticle suspension including a plurality of nanoparticles suspended in a carrier fluid. The method also includes heating the substrate to a first elevated temperature between about 80° C. and about 200° C. to form a self-protective oxide coating, followed by washing the substrate to remove any dried carrier fluid. The substrate can be washed in an ultra-sonic parts washer.

The method further includes applying a boron nitride coating over at least a portion of the self-protective oxide coating, followed by heating the substrate between about 80° C. and about 200° C. to dry the boron nitride coating and form an overcoat layer. The self-protective oxide coating can be configured to inhibit excess oxidation of the surface of the substrate when the gasket is exposed to temperatures greater than or about 600° C., while the overcoat layer can be configured to provide lubricity to the undercoat layer and substrate when the gasket is exposed to temperatures greater than about 600° C.

The invention will be better understood upon review of the detailed description set forth below taken in conjunction with the accompanying drawing figures, which are briefly described as follows.

BRIEF DESCRIPTION OF THE DRAWINGS

FIG. 10 is a table detailing the anti-friction performance of some of the test blanks shown FIGS. 6A-9B.

DETAILED DESCRIPTION

Figures 1A, 1B:
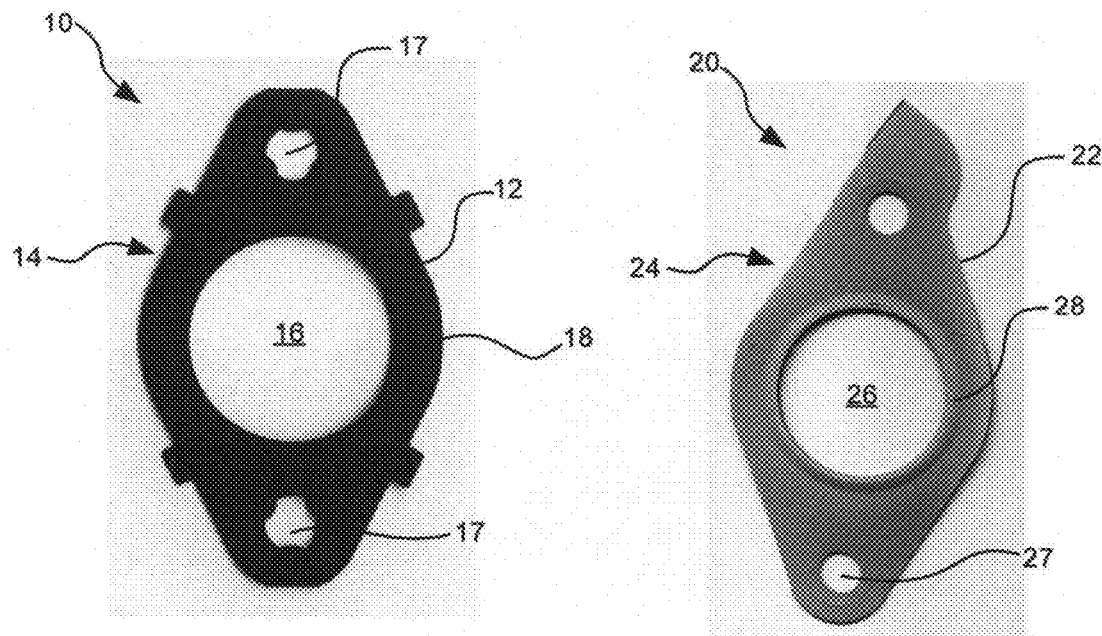
FIGS. 1A-1C are front views of various representative exhaust gaskets for internal combustion engines as found in the prior art.
Figure 1C:
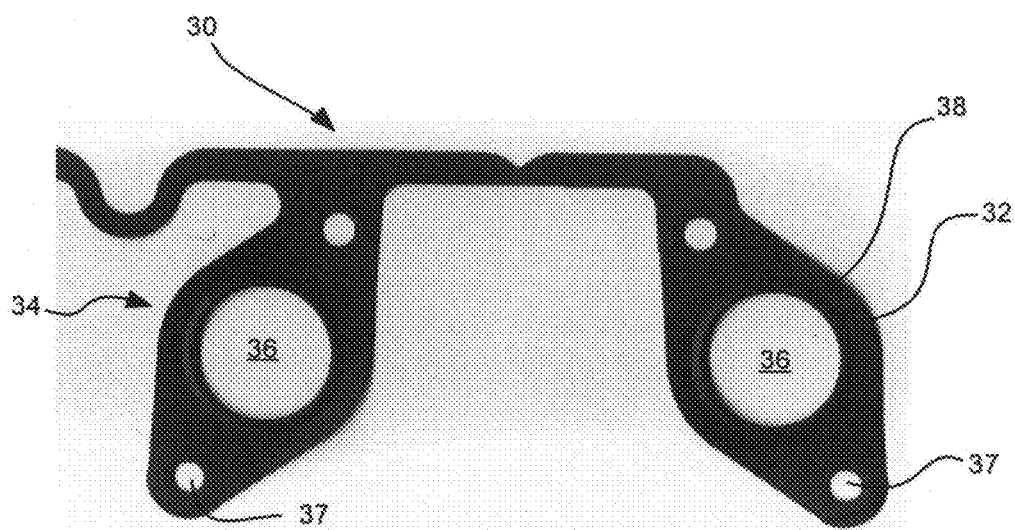

Referring now in more detail to the drawing figures, wherein like parts are identified with like reference numerals throughout the several views, FIGS. 1A-1C illustrate various representative exhaust gaskets 10, 20, 30 for internal combustion engines, respectively, as may be found in the prior art. As can be seen, each of these exhaust gaskets 10, 20, 30 have unique outer shapes or profiles 12, 22, 32 and structural features which are tailored to their particular engine designs, while sharing a plurality of common features that are particularly suited to the application of exhaust gaskets for internal combustion engines. For instance, each of the exhaust gaskets 10, 20, 30 is formed from one or more substantially-planar metal substrates 14, 24, 34 that have been punched or cut to include a central exhaust aperture 16, 26, 36 and two or more fastener apertures or bolt holes 17, 27, 37. The exhaust gaskets 10, 20, 30 also typically include some form of embossment 18, 28, 38 formed into the metal substrate that surrounds the exhaust apertures 16, 26, 36 and provides a raised, smooth surface that contacts and seats against the smooth sealing surfaces of an exhaust system component and the exhaust manifold or exhaust piping (not shown) to provide the seal which prevents the hot exhaust gases from escaping around the gasket.

Each of the prior art exhaust gaskets 10, 20, 30 illustrated in FIGS. 1A-1C may be suitable for use in more typical exhaust gasket applications, in which the working temperature is less than 600° C. However, these same gaskets would not be suitable for high temperature applications where exhaust gasket must maintain a seal during operating temperatures that routinely exceed 600° C., as they would fail to meet the necessary performance standards. For example, the performance criteria for a high temperature exhaust gasket configured to maintain a seal during operating temperatures that exceed 600° C. can include, among other factors, adhesion, lubricity and sealability.

Adhesion generally refers to the ability of the gasket to maintain the structural integrity of its outer surfaces, and in particular the outer sealing surfaces. For instance, through high temperature testing it has been shown that the outer surfaces of the substrates, surface treatments or coatings of typical metallic gaskets can undergo severe oxidation corrosion at elevated temperatures, which generally results in thick oxidation coatings that over time crack and spall into flakes that break away to form an uneven surface that cannot maintain the desired seal.

Lubricity generally refers to the ability of the gasket to accommodate the thermally-induced movement between the engine block and the various parts of the exhaust system and piping. These engine components can often be made from different materials having different coefficients of thermal expansion, which can lead to thermally-induced movement across the exhaust port of the engine block, for example. Accordingly, the outer surfaces of the exhaust gasket should provide sufficient lubricity to allow one or both of the component sealing surfaces to slide over the gasket without scratching, gouging, or tearing away the coating on the raised contact surfaces of the embossments. In one aspect, the lubricity of the surfaces of the exhaust gasket can be measured as the coefficient of friction (COF), with a COF of less than 0.2 being desirable in high temperature applications that can exhibit significant thermally-induced movement across an exhaust port.

Sealability generally refers to the ability of the gasket to limit the leakage of exhaust gases along the interface between the raised, smooth surfaces of the embossment and the generally flat, smooth sealing surfaces of the engine block or a flange on the exhaust manifold or exhaust piping. Because the temperature of an engine exhaust application generally precludes the use of a resilient and conformable gasket material, rigid materials such as stainless steal are required, resulting in metal-on-metal contact between the metallic gasket and the sealing surfaces of the engine components. For this reason, it is typically not possible to establish a complete seal that eliminates all leakage. Thus, a gasket's sealability is a measure of how well of the gasket can limit the leakage rate to acceptable levels. In one aspect, sealability can be measured through pressurized air tests that measure the leak rate for the entire exhaust system after assembly but before operation. Pressurized air tests that measure the leakage across a single gasket that has been installed into a test fixture can also be implemented.

In some instances, the metal substrates 14, 24, 34 of the representative prior art exhaust gaskets 10, 20, 30, in a typical operating environment that is less than 600° C., may be provided with a surface treatment or coating that allows the gaskets to form a better seal than would otherwise be available through direct metal-on-metal contact between the exhaust gasket and the smooth sealing surfaces of the engine block or flanges on the exhaust manifold or exhaust piping. However, these same prior art treatments or coatings have not been shown to maintain the necessary sealing and anti-friction performance in high temperature applications that may exceed 600° C., such as may be encountered in heavy duty internal combustion engine applications.

Figure 2:
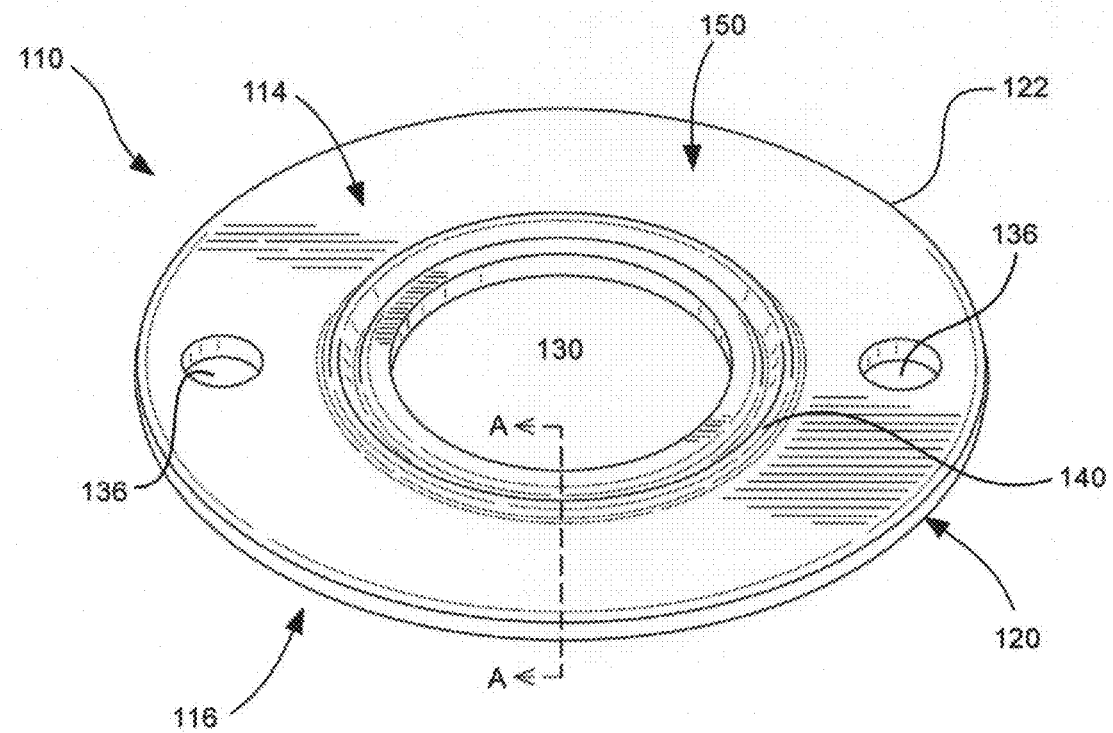
FIG. 2 is a perspective view of an exhaust gasket having a high temperature coating, in accordance with a representative embodiment of the present disclosure.
Figure 3:
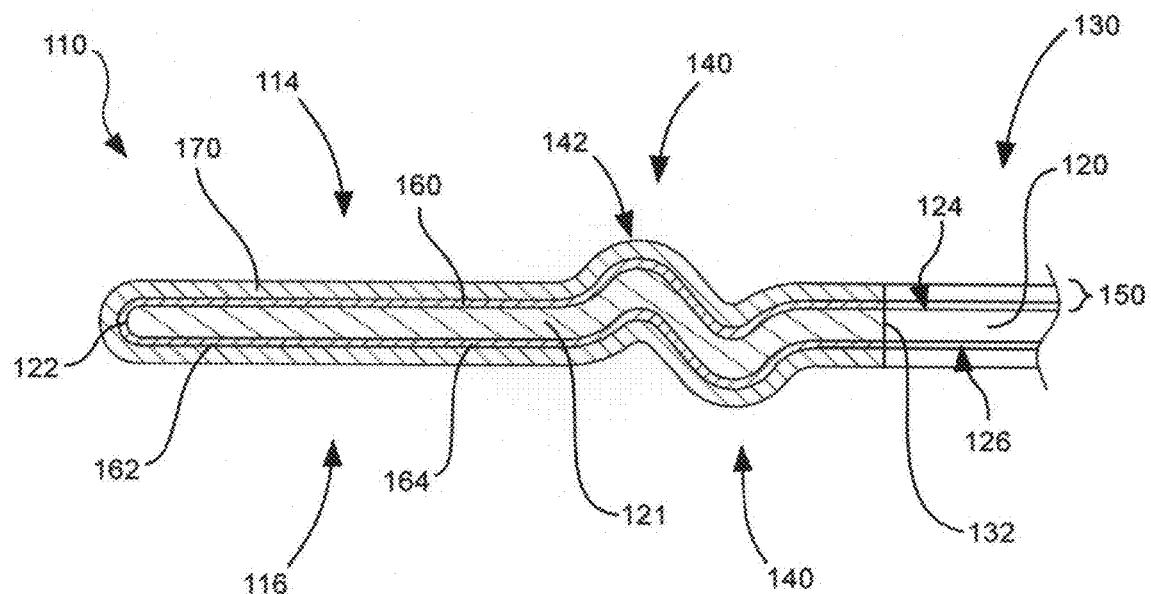
FIG. 3 is a cross-sectional side of the exhaust gasket of FIG. 2, as taken along Section Line A-A.

In accordance with one representative embodiment of the disclosure, FIGS. 2 and 3 illustrate a generically-shaped gasket 110 having a substrate 120 formed from a metallic material. The substrate 120 has been provided with a high temperature coating 150 that overcomes the shortcomings described above. In one aspect, the substrate 120 can be substantially planar with an outer edge 122, an upper surface 124, a lower surface 126, and an exhaust aperture 130 formed through the substrate 120 from the upper surface 124 to the lower surface 126. The exhaust aperture 130 can have an inner edge 132 which generally contacts the working fluid (e.g. exhaust gases) being sealed by the gasket 110. The substrate 120 can also include one or more fastener apertures or bolt holes 136 spaced apart from the exhaust aperture 130 and through which a bolt or similar fastener can be extended to draw together the components being sealed by the gasket. The substrate 120 can further include an embossment 140 surrounding the aperture 130 and extending outwardly away from at least one of the upper surface 124 and the lower surface 126. The embossment 140 can provide a raised, smooth, outermost surface 142 that contacts and seats against the smooth sealing surfaces of the coupled components to provide a seal that prevents the working fluid from escaping around the gasket 110.

The gasket 110 with the high temperature coating 150 shown in FIGS. 2-3 is generally configured as an exhaust gasket for application between an exhaust system component and an exhaust manifold or exhaust piping (not shown), for sealing the exhaust gases exiting from an exhaust port in the engine block. It is to be appreciated, however, that the gasket 110 and the coating 150 may be suitable for wide variety of different high temperature sealing applications, and for sealing against a variety of working fluids, each of which may be considered to fall within the scope of the present disclosure.

The substrate 120 of the gasket can generally be formed from a metallic base material 121, such as a stainless steel alloy, which maintains its bulk properties at high temperatures greater than 600° C. While stainless steel alloys, and especially ferric stainless steel alloys, may be considered a preferred embodiment, the substrate may also be formed from other high temperature-resistant metals, such as alloys of aluminum, nickel or titanium, or from other temperature-resistant non-metallic materials, such as ceramics.

The high temperature coating 150 of the gasket 110 can generally comprise a multi-layered coating system that includes a first layer or undercoat 160 that is in intimate contact with the upper surface 124 and the lower surface 126 of the substrate 120, and a second layer or overcoat 170 that covers the undercoat 160. The undercoat 160 can provide a layer of protection over the base alloy 121 forming the substrate 120, so as to resist the severe oxidation corrosion that would otherwise occur on the outer surfaces 124, 126 of the substrate 120 in high temperature applications. Thus, the undercoat 160 can be configured to meet the adhesion criteria of the gasket 110 and to maintain the structural integrity of its outer surfaces 124, 126. In addition, the overcoat 170 is typically an anti-friction or lubricious layer that contacts the sealing surfaces of the coupled components, and can generally provide the characteristics which meet both the lubricity and sealability criteria of the gasket 110.

In general, both the undercoat 160 and the overcoat 170 will cover substantially all of the upper surface 124, lower surface 126, as well as the exterior and interior side edges 122, 132 of the substrate 120, so as to provide maximum protection to the base alloy 121 forming the substrate 120. However, as the primary area of contact between the gasket 110 and the sealing surfaces of the coupled components may be located proximate the raised contact surface 142 of the embossment 140, in some aspects it is contemplated that overcoat 170 may only be applied locally or proximate to the embossment 142 and not to other portions of the outer surfaces 124, 126 of the substrate 120.

The first layer or undercoat 160 can comprise a protective coating that is formed from a plurality of nanoparticles that have been applied in a solution or suspension (more accurately referred to hereinafter as a "nanoparticle suspension", or "suspension") to the outer surfaces (and edges) of the substrate 120. The suspension can be rolled, sprayed or brushed onto the substrate, or the substrate 120 can be dip coated into the suspension. In one aspect, a single application of the nanoparticle suspension can generally be sufficient to deposit the desired amount of nanoparticles onto the surfaces 124, 126, 122, 132 of the substrate 120. However, in other aspects the nanoparticle suspension can be applied and dried multiple times until the materials deposited onto the surface of the substrate have reach their desired coverage and concentration, with the substrate being air dried at ambient temperature or heat dried at a temperature that is generally less than 100° C. The substrate 120 and the applied nanoparticles can then be heated together to a first elevated temperature and for a predetermined period of time to form the protective undercoat 160 that resists the severe oxidation corrosion that would otherwise occur on the surfaces 124, 126, 122, 132 of the substrate 120.

In one aspect, the average size of the nanoparticles can be 50 nanometers or less. In other aspects, the average size of the nanoparticles can be 20 nanometers or less, or even 10 nanometers or less. Furthermore, the nanoparticles can generally be oxides of an element, including but not limited to cerium oxide nanoparticles, titanium oxide nanoparticles, aluminum oxide nanoparticles, silicon oxide nanoparticles, scandium oxide nanoparticles, yttrium oxide nanoparticles, zirconium oxide nanoparticles, niobium oxide nanoparticles, hafnium oxide nanoparticles, tantalum oxide nanoparticles, and thorium oxide.

In one embodiment of the present disclosure, the individual nanoparticles can be broadly scattered or dispersed over the surfaces of the substrate, without forming a continuous layer. The dispersed and scattered nanoparticles can then interact with the base alloy 121 of the substrate 120 during heating to the first elevated temperature to form a thin, self-protective oxide coating 162. The oxide coating 162 grows or forms to cover the surfaces of the substrate substantially completely, as described in U.S. Pat. No. 8,197,613, which issued on Jun. 12, 2012. This patent is incorporated by reference in its entirely herein and for all purposes.

Without being bound to any particular mechanism or theory, it is contemplated that the nanoparticles that are scattered and dispersed over the surface of the substrate serve as nucleation sites for the development and growth of a fine-grained, uniform, and stable thermal oxide coating 162 that forms as a result of oxidation of the base alloy 121 during the heating process. In one aspect, the first elevated temperature can be greater than or about 600° C. and for a period ranging from about one minute to about forty-eight hours. In yet another aspect, the first elevated temperature can be greater than or about 800° C. and for a period ranging from about one minute to about forty-eight hours.

Alternatively, through experimentation and practice it has been discovered that it may also be possible to form the self-protective oxide coating at temperatures far below those elevated temperatures that were previously considered. For instance, and again without being bound to any particular mechanism or theory, it is also contemplated that the substrate may only require heating to a temperature as low as 200° C., or even to temperatures as low as 80° C. to 100° C., to form the thin, self-protective oxide coating 162. Thus, in one representative embodiment the first elevated temperature for forming the self-protective oxide coating, or undercoat layer, can range between about 80° C. and about 600° C., while in another embodiment the first elevated temperature can range between about 80° C. and about 200° C., and in yet another embodiment the first elevated temperature can range between about 80° C. and about 100° C. In the above embodiments, the substrate coated in the nanoparticle solution can be maintained at the first elevated temperature for a period of time ranging from about five minutes to about thirty minutes, with a preferred period of time being nearer the shorter end of the range, or about five minutes, so as to reduce the time and cost needed to form the self-protective oxide coating during manufacturing.

The suspension of nanoparticles used to form the undercoat layer 160 can include the nanoparticles suspended in a volatile carrier fluid, such as toluene, that can be readily evaporated at room temperature to deposit the nanoparticles onto the surfaces 124, 126, 122, 132 of the substrate 120. In this embodiment the carrier fluid can simply evaporate or burn off during the heating step that forms the protective undercoat.

In other embodiments the carrier fluid can comprise a mixture of water and a surfactant, such as soap, that can leave a residue on the substrate during the heating step used to create the protective undercoat. As the surfactant residue can affect the bonding between the protective undercoat layer and the lubricious overcoat layer, the residue can be removed from the substrate by washing the substrate to remove the residue prior to applying the second layer or overcoat 170 over the undercoat 160. In one aspect, the substrate can be washed in an ultra-sonic parts washer filled with clean water or other cleanser, and then dried prior to the application of the second layer or overcoat 170.

In yet another embodiment of the present disclosure, the first layer or undercoat 160 can be formed from a plurality of nanoparticles that have been applied to the outer surfaces 124, 126 (and edges) of the substrate 120 in sufficient quantity and concentration to form a substantially continuous layer of nanoparticles having a thin but measurable thickness. The substrate 120 and applied nanoparticles can then be heated to a first elevated temperature that may be less than or about 600° C. Again, without being bound to any particular mechanism or theory, it is contemplated that the continuous layer of nanoparticles is dried and calcinated during the heating process to form a thin protective coating or film 164 of nanoparticles that covers and protects the base alloy 121 from severe oxidation at higher working temperatures.

After the first layer or undercoat 160 has been formed over the outer surfaces 124, 126 of the substrate 120 through the application and heating of nanoparticles, a second layer or overcoat 170 can be applied over the undercoat 160 to provide lubricity and sealability to the outer surfaces 114, 116 of the gasket 110 when the gasket is exposed to temperatures greater than about 600° C. In one aspect of the present disclosure, the anti-friction or lubricious overcoat 170 can comprise boron nitride, which can be applied over substantially all of the surface area of the undercoat 160, as shown in FIG. 3, or which may be limited in application to the raised contact surfaces 142 of any embossments 140 which may be formed into the substrate 120.

As with the nanoparticle solution, the overcoat 170 can be applied to the surfaces of the substrate 120 as a liquid, such as a solution comprising boron nitride, which can be rolled, sprayed or brushed onto the substrate, or into which the substrate 120 can be dip coated. After application, the liquid overcoat can then be heat dried at a second elevated temperature that can range, in one aspect, between about 80° C. and about 200° C. In another aspect, the second elevated temperature can range between about 80° C. and about 100° C. The substrate with the self-protective undercoat layer 160 that is coated, at least in part, with the overcoat layer can be maintained at the second elevated temperature for a period of time ranging from about five minutes to about thirty minutes, with a preferred period of time being nearer the shorter end of the range, or about five minutes, so as to reduce the time and cost needed to form the anti-friction or lubricious overcoat 170 during manufacturing. In general, a single application of the overcoat can be sufficient to form the lubricious overcoat 170 on top self-protective undercoat layer 160. However, multiple applications are also possible and considered to fall within the scope of the present disclosure.

In yet another embodiment of the present disclosure, the nanoparticles that form the first layer or undercoat 160 may be applied to the surfaces 124, 126 (and edges 122, 132) of the substrate 120, followed immediately by the boron nitride coating that forms the second layer or overcoat 170, and prior to any significant heating of the substrate other than for evaporating the carrier fluids to deposit the layer of nanoparticles and the layer of boron nitride onto the outer surfaces. The substrate 120, the layer of nanoparticles, and the layer of boron nitride can then be heated together to the first elevated temperature to develop simultaneously the protective undercoat 160 and the sealable anti-friction overcoat 170, thus forming the multi-layered high temperature coating 150. In this embodiment, the layer of boron nitride may operate as a barrier to prevent oxygen from reaching and reacting with the nanoparticles and the base alloy 121, so that the protective first layer or undercoat 160 develops during the heating step at the first elevated temperature, but without the presence of significant oxygen. The final step of heating the gasket 110 to the first elevated temperature can take place in a controlled environment during the normal manufacturing process, or in the alternative, may take place during the first use of the gasket 110 after it has been installed into its application, such as the engine exhaust application described above.

Figure 4:
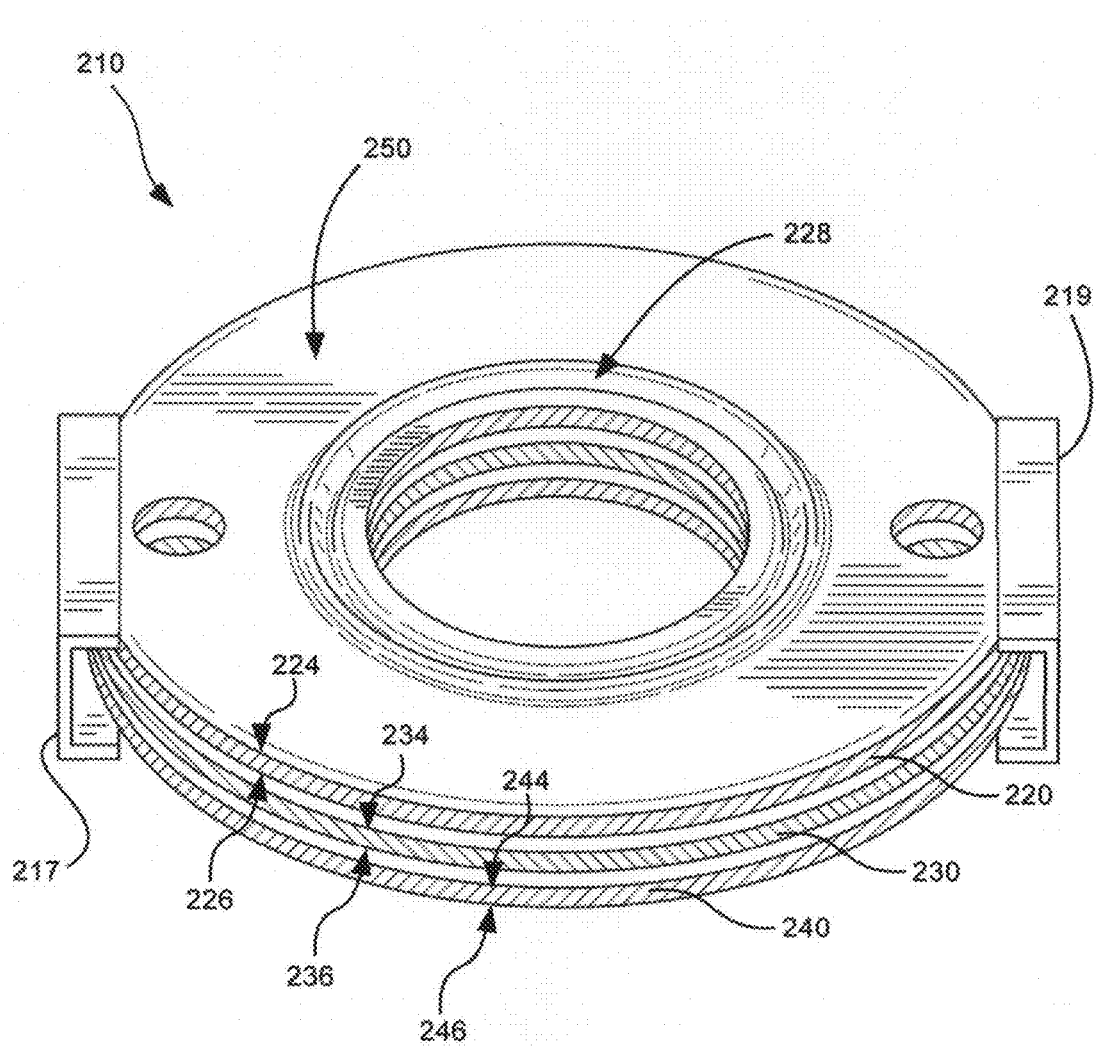
FIG. 4 is a perspective view of an multi-layer exhaust gasket having a high temperature coating, in accordance with another representative embodiment of the present disclosure.

FIG. 4 is a perspective view of another representative embodiment of the present disclosure, in which the generically-shaped exhaust gasket 210 includes a plurality of substrates 220, 230, 240 that are linked together near opposite ends of the gasket with linking mechanisms 217, 219. The linking mechanisms 217, 219 can allow for limited relative movement between the substrates 220, 230, 240 so as to accommodate the thermally-induced movement of the coupled components across the exhaust port. In one aspect, the two-layered high temperature coating 250 can by applied to each of the top and bottom surfaces 224, 226 of the upper substrate 220, each of the top and bottom surface 234, 236 of the middle substrate 330, and each of the top and bottom surface 244, 246 of the lower substrate 240. In another aspect, the two-layered high temperature coating 250 may only by applied to the outer surfaces of the gasket 210, namely the top surface 224 of the upper substrate 220 and the bottom surface 246 of the lower substrate 240. Other configurations are also possible, such as with the protective undercoat 260 being applied to all surfaces of the multi-substrate gasket, while the overcoat 270 is only applied over the undercoat 260 at the raised contact surfaces 228 that experience sliding contact with another substrate or with a sealing surface of a coupled component, such as the engine block and the exhaust manifold or exhaust piping.

Figure 5:
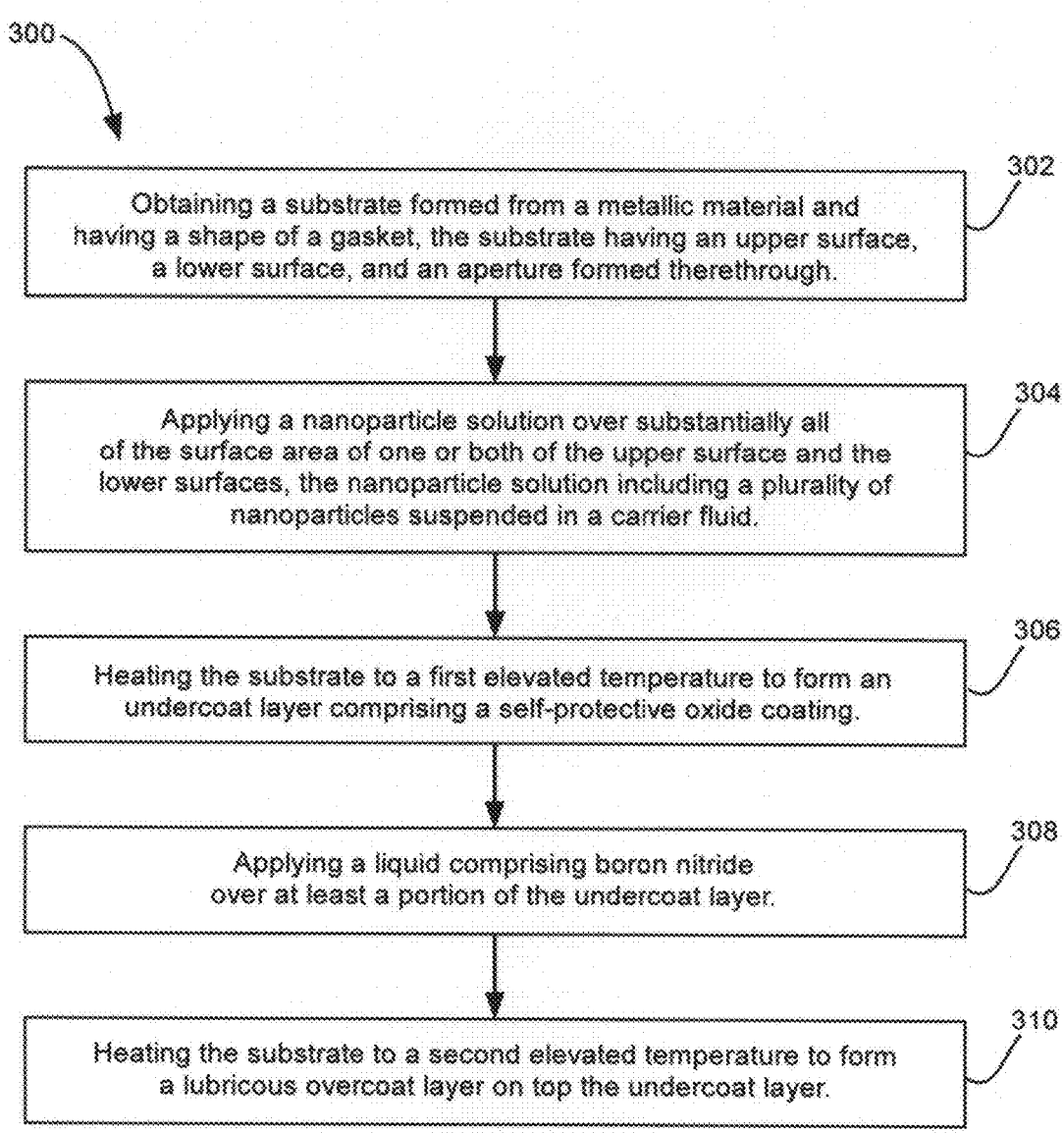
FIG. 5 is a flowchart depicting a method for forming the high temperature coating of FIGS. 2-3, in accordance with another representative embodiment of the present disclosure.

FIG. 5 is a flowchart depicting a representative method 300 for forming a gasket with the high temperature coating of FIGS. 2-3, in accordance with another representative embodiment of the present disclosure. The method 300 includes the step of obtaining 302 a substrate formed from a metallic material and having the shape of a gasket, with the substrate having an upper surface, a lower surface, and an aperture formed therethrough. The method 300 also includes the step of applying 304 a nanoparticle suspension over substantially all of the surface area of one or both of the upper surface and the lower surface, wherein the nanoparticle suspension includes a plurality of nanoparticles suspended in a carrier fluid. Optionally, the method can also drying or evaporating the nanoparticle suspension to deposit the plurality of nanoparticles into contact with the surface of the substrate. If applicable, the steps of applying 304 and drying the nanoparticle suspension can be performed multiple times until the desired amount of nanoparticles has been distributed over the surfaces of the substrate.

After the desired amount of nanoparticles has been deposited onto the surfaces of the substrate, the substrate and nanoparticle solution/nanoparticles are heated 306 to a first elevated temperature and for a predetermined period of time to form the undercoat layer. In one aspect of the disclosure, the first elevated temperature can range between about 80° C. and about 600° C. and for a period ranging from about one minute to about forty-eight hours. In a preferred embodiment, the first elevated temperature can range between about 80° C. and about 100° C. and for a period of about five minutes. It is considered that this temperature treatment causes a thin, self-protective oxide coating to be formed from the base alloy which may substantially cover the surfaces of the substrate and is configured to inhibit excess additional oxidation of the surface of the substrate when the gasket is exposed to temperatures greater than or about 600° C.

The method 300 further includes the step of applying 308 a liquid comprising boron nitride over at least a portion of the undercoat layer, and heating 310 the substrate to a second elevated temperature to form the lubricious overcoat layer over the undercoat layer. In one aspect of the disclosure, the second elevated temperature can range between about 80° C. and about 100° C. and for a period ranging from about one minute to about thirty minutes. This temperature treatment dries the boron nitride liquid into a overcoat layer on top of the undercoat layer, and which overcoat layer is configured to provide lubricity to the undercoat layer and substrate when the gasket is exposed to temperatures greater than about 600° C.

FIGS. 6A and 6B through 11A and 11B illustrate the results of laboratory testing performed on stainless steel test blanks that were subjected to various combinations of the coatings and heat treatments described above, and then evaluated in accordance with the performance criteria for high temperature exhaust gaskets, namely adhesion, lubricity and sealability. The photographs also provide a visual indication of the adhesion performance of the test coatings.

Figure 6A:
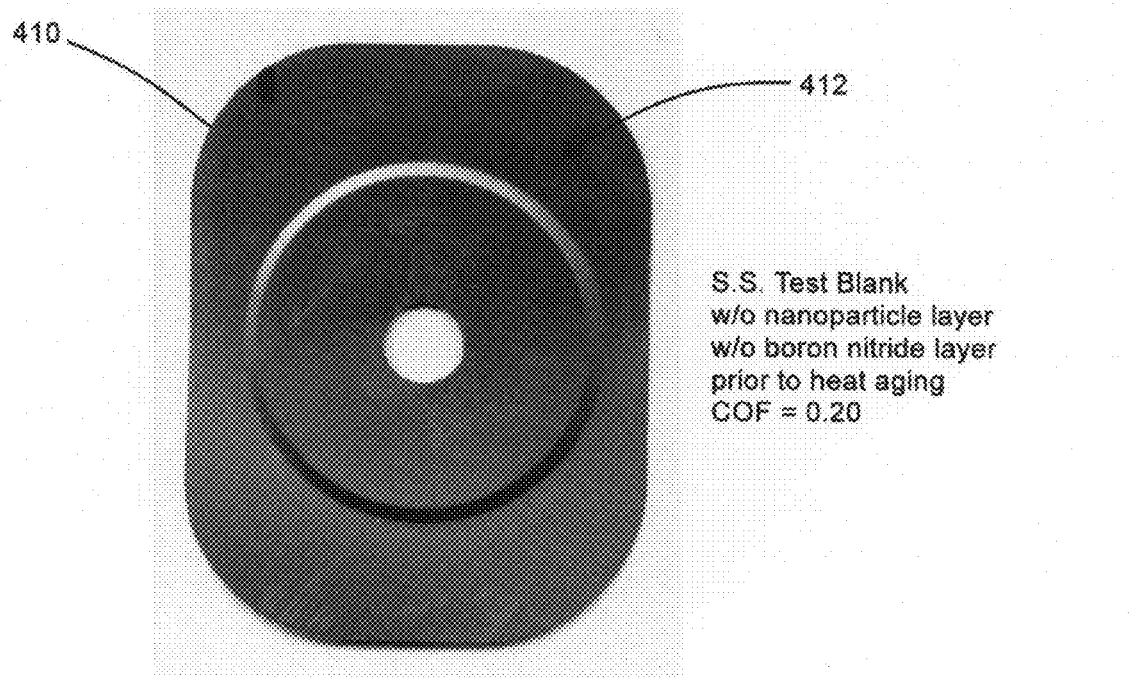
FIGS. 6A-6B are photographs of bare, stainless steel test blanks without coatings, before and after heat aging at 800° C., respectively.
Figure 6B:
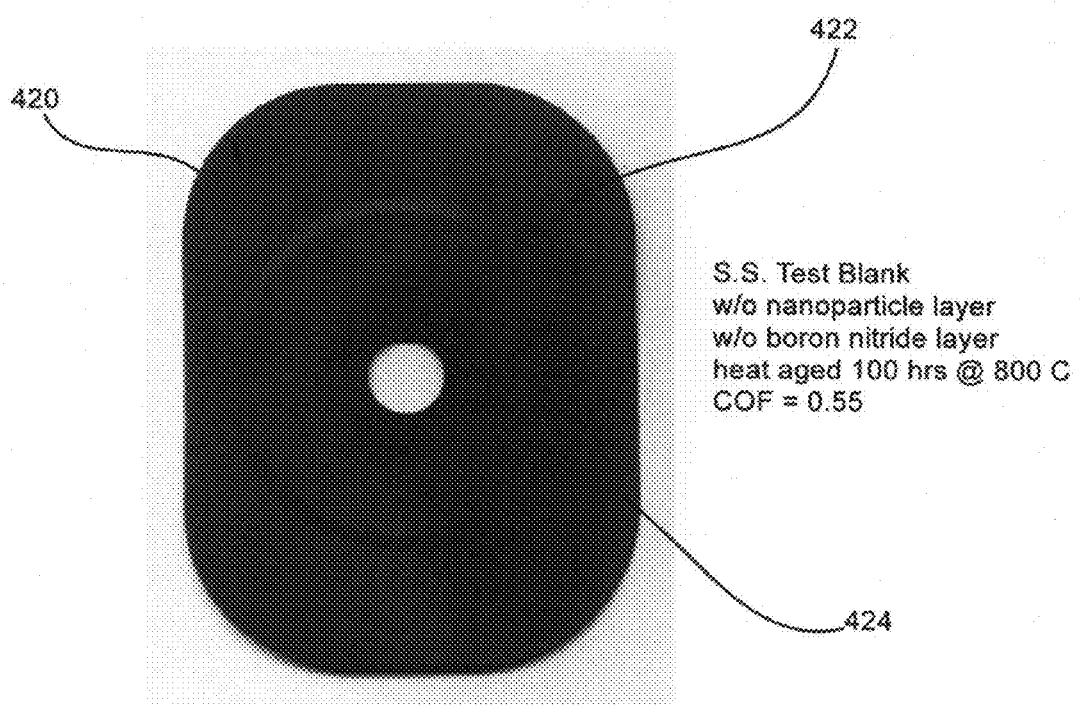

First, FIGS. 6A-6B and 7A-7B illustrate testing conducted for control and baseline purposes. For example, FIG. 6A is a photograph of a stainless steel test blank 410 that is bare and without any coating, and prior to any heat treatment. The surface 412 of the untreated and unheated test blank 410 is smooth and shiny, and has a COF of 0.20. In contrast, FIG. 6B is a photograph of a similar stainless steel test blank 420 which also is bare and without any coating, and which has been subjected to heat aging at 800° C. in a test oven for 100 hours. In contrast to the unheated test blank 410, the surface 422 of the heat-aged test blank 420 has undergone extensive non-uniform oxidation, especially in the darker areas 424, to become dull, coarse, and generally unsuitable for forming a seal. The heat-aged test blank also has a significantly higher COF of 0.55. FIG. 6B illustrates the damage that can transpire to unprotected stainless steel when exposed to higher working temperatures.

Figure 7A:
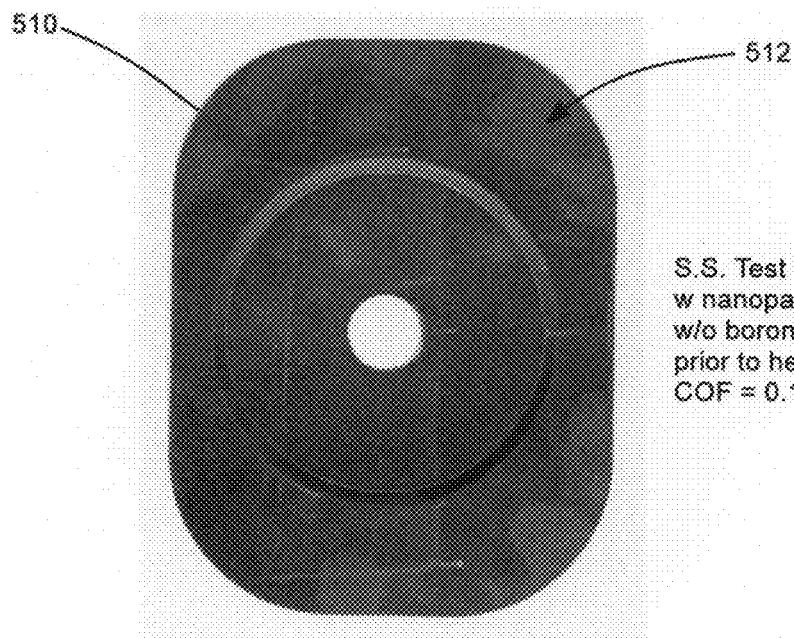
FIGS. 7A-7B are photographs of stainless steel test blanks with a nanoparticle coating, before and after heat aging at 800° C., respectively.
Figure 7B:
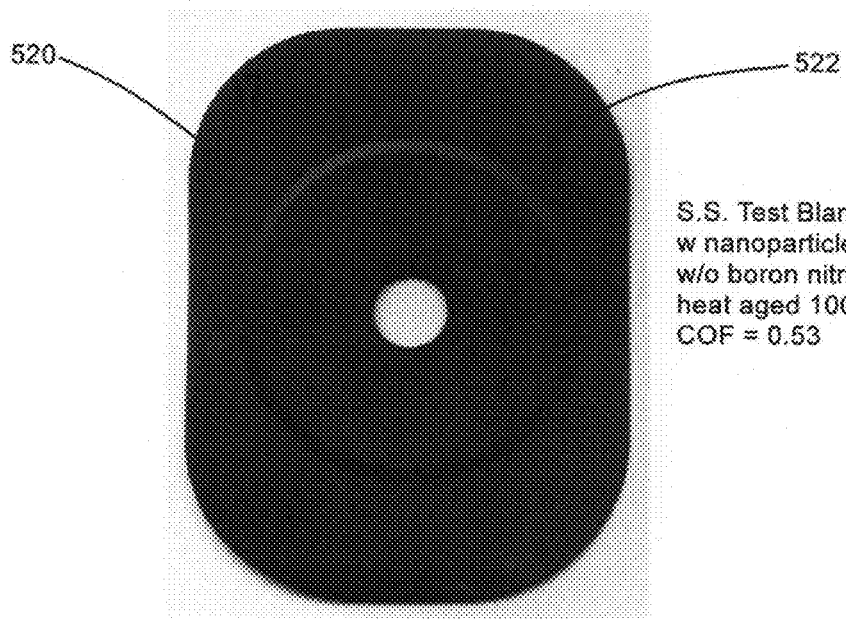

FIG. 7A is a photograph of a stainless steel test blank 510 that has been coated with a layer of nanoparticles, and prior to any heat treatment. The surface 512 of the unheated test blank 510 is still smooth and shiny, as the nanoparticles are invisible, and has an improved COF of 0.16. FIG. 7B is a photograph of a similar stainless steel test blank 520 which has also been coated with the layer of nanoparticles and then subjected to heat aging at 800° C. in a test oven for 100 hours. In contrast to the heat-aged test blank 420 having the bare surface, the outer surface 522 of the heat-aged test blank 520 with the nanoparticle layer has undergone oxidation into the fine-grained, uniform and stable thermal oxide coating described above, although with a COF of 0.53 that is similarly-high with the untreated stainless steel.

Figure 8A:
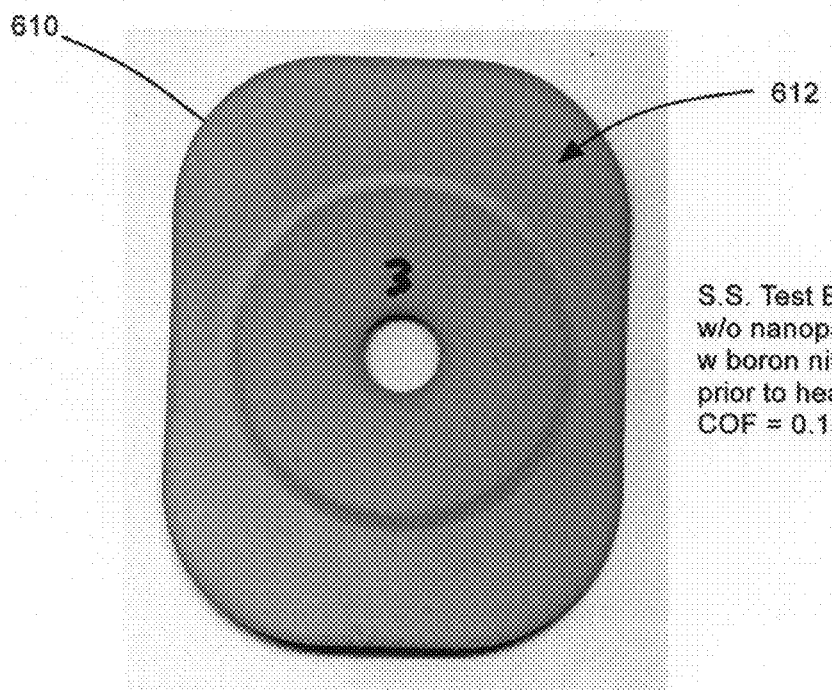
FIGS. 8A-8B are photographs of stainless steel test blanks with a boron nitride coating, before and after heat aging at 800° C., respectively.
Figure 8B:
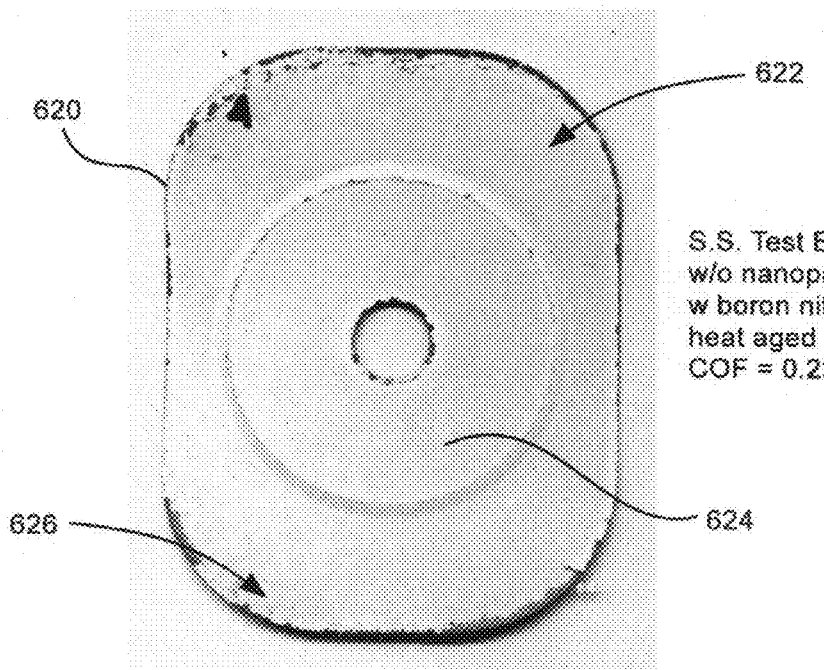

FIG. 8A is a photograph of a stainless steel test blank 610 that received a coating of boron nitride, but without the nanoparticle undercoat layer, and prior to any heat treatment. The surface 612 of the unheated test blank 610 is still smooth but no longer shiny, as the base metal is covered by the boron nitride coating and is no longer visible. The unheated, boron nitride-coated test blank 610 has COF of 0.15. FIG. 8B is a photograph of a similar stainless steel test blank 620 which has also received a coating of boron nitride, but without the nanoparticle undercoat layer, and then subjected to heat aging at 800° C. in a test oven for 100 hours.

As can be seen in FIG. 8B, the outer surface 622 of the heat-aged test blank 620 includes portions 624 of the boron nitride coating near the center of the blank that remain substantially intact, and with a relatively low COF of 0.22. However, there are other regions 626 of the boron nitride coating near the outer edges of the blank 620 where the coating has lost its ability to adhere to the underlying substrate, and instead has begun to degrade, spall, and flake away. It is contemplated that the degradation is the result of oxidation of the stainless steel blank near the boundary with the boron nitride coating which causes the coating to loose its ability to adhere to the substrate, and not degradation of the coating itself.

Figure 9A:
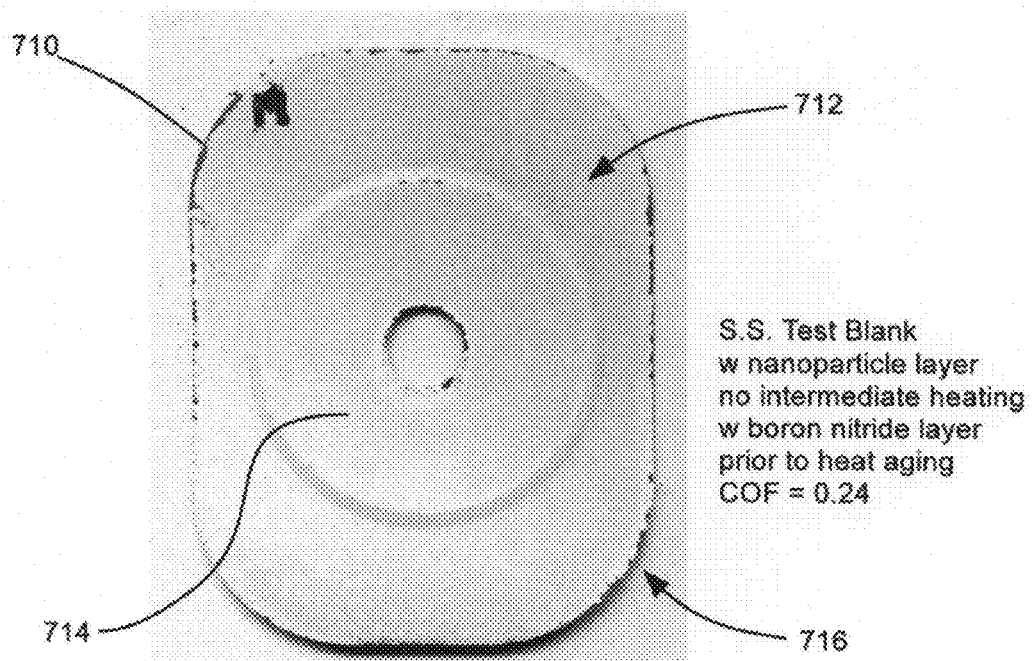
FIGS. 9A-9B are photographs of stainless steel test blanks with both a nanoparticle undercoat a boron nitride overcoat after heat aging at 800° C.
Figure 9B:
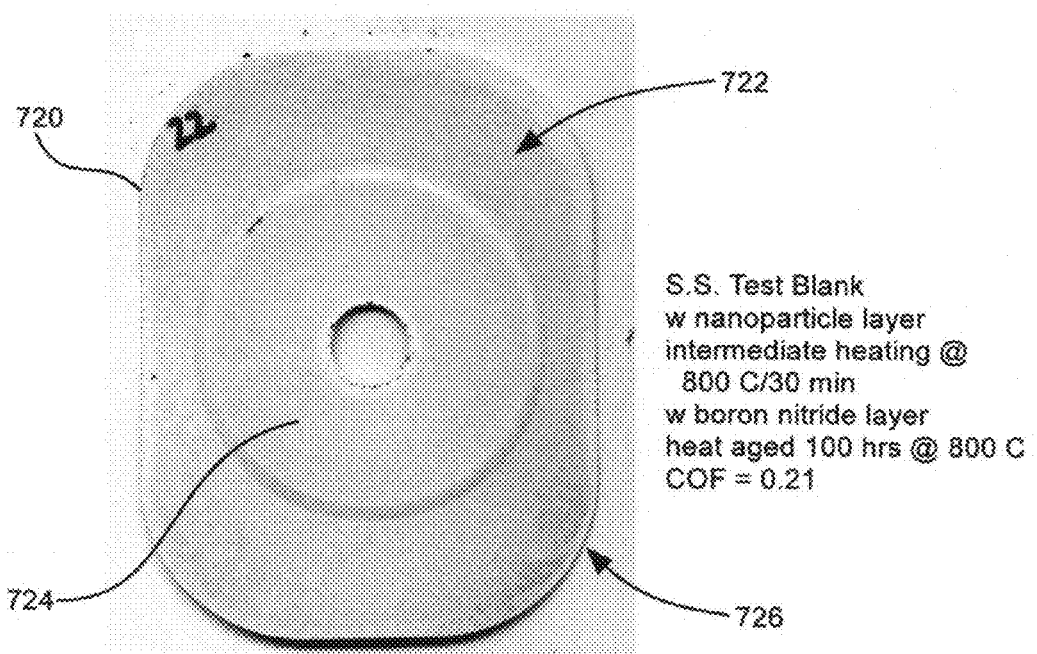

FIGS. 9A and 9B are photographs of stainless steel test blanks 710, 720 that received both a nanoparticle undercoat layer and a boron nitride overcoat layer, and that were then subjected to heat aging at 800° C. in a test oven for 100 hours. Although not shown, the coated test blanks had appearances and coefficients of friction similar to those shown with the test blank 610 of FIG. 8A, prior to the heat aging. The blank 720 of FIG. 9B differs from the previous tests in that the stainless steel blank and nanoparticle undercoat layer were subjected to an intermediate heating to a first elevated temperature of 800° C. for thirty minutes, and then cooled prior to application of the boron nitride overcoat layer. This intermediate heating was not applied to test blank 710 of FIG. 9A.

As can be seen in FIG. 9A, the surface 712 of the test blank 710 that did not receive the intermediate heat treatment had intact central portions 714 having a relatively low COF of 0.24, but still exhibited some spalling and lack of adherence in regions 716 near the outer edges. In contrast, the best overall results were demonstrated by the surface 722 of the test blank 720 which received the intermediate heat treatment. As shown, the outer surface 722 both maintained its integrity and adherence in the edge regions 726 while providing the lowest COF (0.21) near the central sealing portions 724 of any of the heat aged samples.

FIG. 10 is a table 800 that shows the numerical data for the test results shown in FIGS. 6A and 6B through 9A and 9B, which were conducted on multiple test blanks or samples. Table 800 also includes test data taken after some additional test blanks were heat aged for a shorter time period of only 16 hours.

Figure 11A:
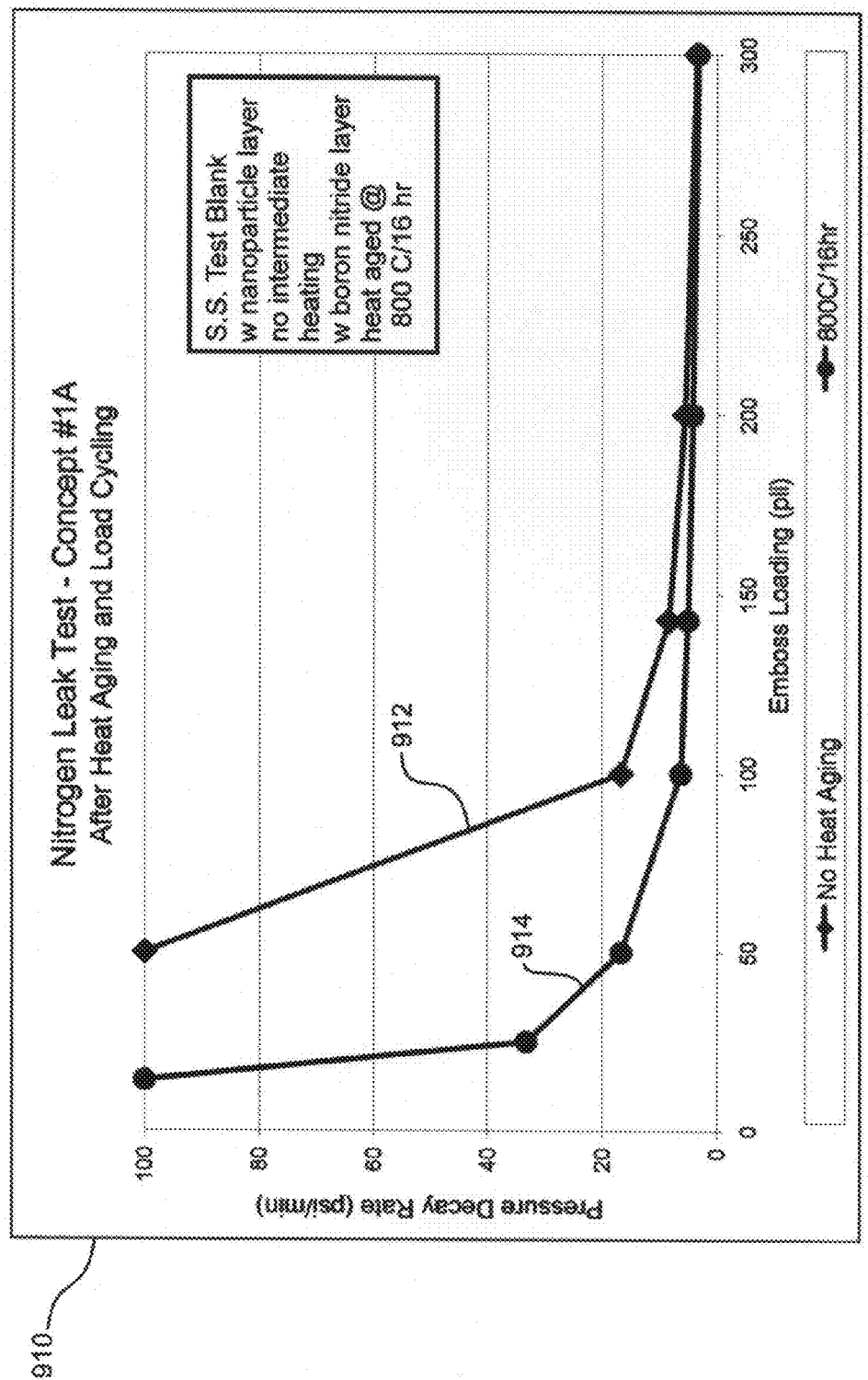
FIGS. 11A-11B are graphs detailing the sealability performance of the test coatings illustrated in FIGS. 8A-8B and 9A-9B, respectively.

FIG. 11A is a graph 910 of the results from "before and after" sealability tests that were performed on a test blank that received both the nanoparticle undercoat layer and the boron nitride overcoat layer, and that was then subjected to heat aging at 800° C. in a test oven for 16 hours. Line 912 shows the results for a nitrogen leak test performed on the test blank prior to heat aging, while line 914 shows the improvement in sealability for the high temperature coating after heat aging. The test blank evaluated in graph 910 (FIG. 11A) did not receive the intermediate heating described above.

Figure 11B:
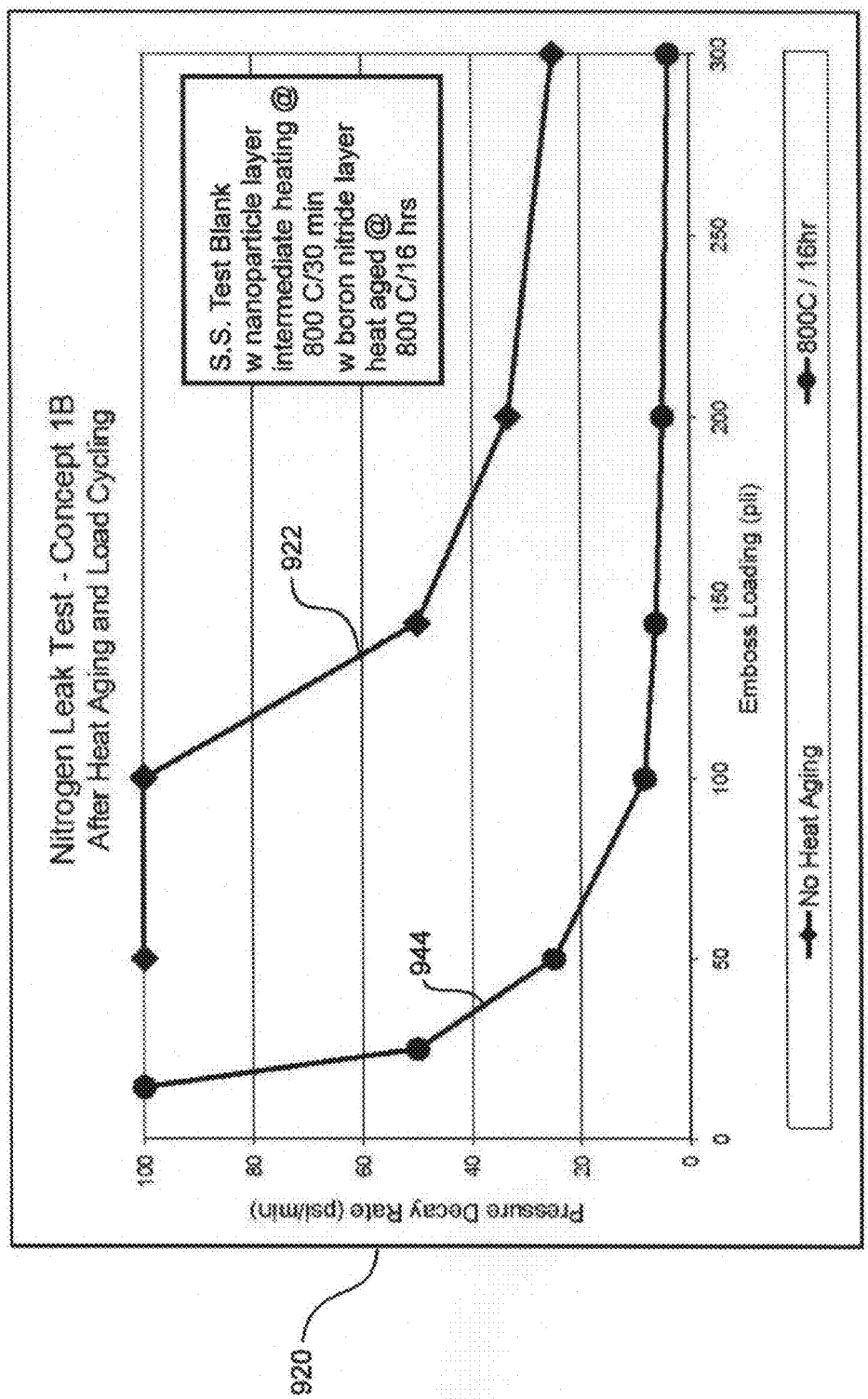

FIG. 11B is a graph 920 of the results from "before and after" sealability tests that were performed on a test blank which received the nanoparticle undercoat layer, the intermediate heating, and the boron nitride overcoat layer, and that was then subjected to heat aging at 800° C. in a test oven for 16 hours. Line 922 shows the results for a nitrogen leak test performed on the test blank prior to the extended heat aging, while line 924 again shows the improvement in sealability for the high temperature coating after heat aging. Thus, with regard to the criteria for sealability, the test blanks which received both the nanoparticle undercoat layer and the boron nitride overcoat layer performed similarly well, with or without the intermediate heating.

The invention has been described in terms of preferred embodiments and methodologies considered by the inventors to represent the best mode of carrying out the invention. A wide variety of additions, deletions, and modification might well be made to the illustrated embodiments by skilled artisans within the scope of the invention. For example, the substrate of the gasket may be subjected to a variety of surface treatments prior to the application of the nanoparticle layer of the high temperature coating, such as sandblasting and acid etching. These and other revisions might be made by those of skill in the art without departing from the spirit and scope of the invention, with is constrained only by the following claims.

What is claimed is:

1. An exhaust gas gasket having a high temperature coating, the exhaust gas gasket comprising:
    a substrate formed from a solid metallic material through the thickness thereof and having a shape of a gasket, the substrate having an upper surface, a lower surface, and an aperture formed therethrough;
    an undercoat layer covering substantially all of the surface area of at least one of the upper surface and the lower surface, the undercoat layer comprising a self-protective oxide coating formed from a plurality of nanoparticles applied to the surface and heated to a first elevated temperature to form the self-protective oxide coating; and
    an overcoat layer formed on the undercoat layer to provide lubricity to the surface of the gasket, the overcoat layer comprising boron nitride,
    wherein the combination of the undercoat layer and the overcoat layer prevents the deterioration of the lubricity of the overcoat layer when the gasket is exposed to repeated thermal cycling between ambient temperature and an operational temperature of 600° C. or greater.

2. The gasket of claim 1, wherein the undercoat layer is configured to inhibit excess oxidation of the surface of the substrate when the gasket is exposed to temperatures greater than about 600° C.

3. The gasket of claim 1, wherein the plurality of nanoparticles have been applied to the surface of the substrate in a nanoparticle suspension that includes a plurality of nanoparticles suspended in a carrier fluid.

4. The gasket of claim 1, wherein the plurality of nanoparticles have an average particle size of less than about 50 nanometers.

5. The gasket of claim 1, wherein the plurality of nanoparticles have an average particle size of less than about 20 nanometers.

6. The gasket of claim 1, wherein the plurality of nanoparticles have an average particle size of less than about 10 nanometers.

7. The gasket of claim 1, wherein the plurality of nanoparticles are selected from the group consisting of cerium oxide nanoparticles, titanium oxide nanoparticles, aluminum oxide nanoparticles, silicon oxide nanoparticles, scandium oxide nanoparticles, yttrium oxide nanoparticles, zirconium oxide nanoparticles, niobium oxide nanoparticles, hafnium oxide nanoparticles, tantalum oxide nanoparticles, and thorium oxide nanoparticles.

8. The gasket of claim 1, wherein the overcoat layer is limited to an area proximate an embossment surrounding the aperture and extending outwardly away from at least one of the upper surface and the lower surface.

* * * * *